United States Patent
Kuo et al.

(10) Patent No.: US 11,507,876 B1
(45) Date of Patent: Nov. 22, 2022

(54) SYSTEMS AND METHODS FOR TRAINING MACHINE LEARNING MODELS TO CLASSIFY INAPPROPRIATE MATERIAL

(71) Applicant: Meta Platforms, Inc., Menlo Park, CA (US)

(72) Inventors: Shiun-Zu Kuo, Dublin, CA (US); Ziqi Wang, London (GB); Bi Xue, Foster City, CA (US); Yuxiang Liu, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 557 days.

(21) Appl. No.: 16/230,850

(22) Filed: Dec. 21, 2018

(51) Int. Cl.
*G06N 20/00* (2019.01)

(52) U.S. Cl.
CPC ...................... *G06N 20/00* (2019.01)

(58) Field of Classification Search
CPC ......... G06Q 50/01; H04L 51/32; H04L 51/12; G06N 20/00
See application file for complete search history.

(56) References Cited

U.S. PATENT DOCUMENTS

| | | | | |
|---|---|---|---|---|
| 8,843,427 B1* | 9/2014 | Lin | ........................ | G06N 20/00 706/45 |
| 2011/0314011 A1* | 12/2011 | Buehrer | ................ | G06F 16/951 707/769 |
| 2014/0365382 A1* | 12/2014 | Rubinstein | ............. | G06Q 10/10 705/309 |
| 2015/0163184 A1* | 6/2015 | Kanter | .................... | G06Q 50/01 709/204 |
| 2016/0042296 A1* | 2/2016 | Shan | .................... | G06F 16/9535 706/11 |
| 2016/0378869 A1* | 12/2016 | Nittka | .................... | G06F 16/355 707/710 |
| 2018/0060326 A1* | 3/2018 | Kuo | ..................... | G06F 16/9535 |
| 2020/0034419 A1* | 1/2020 | Bondugula | ........... | G06F 40/295 |
| 2020/0034750 A1* | 1/2020 | Ritter | ..................... | G06N 20/00 |

OTHER PUBLICATIONS

A. Founta et al., "A Unified Deep Learning Architecture for Abuse Detection," published Feb. 21, 2018 (Year: 2018).*

* cited by examiner

*Primary Examiner* — Eric J Yoon

(74) *Attorney, Agent, or Firm* — Sheppard Mullin Richter & Hampton LLP

(57) ABSTRACT

Systems, methods, and non-transitory computer-readable media can be configured to acquire at least one instance of positive training data based at least in part on at least one source. A set of supplemental positive training data can be generated based at least in part on the at least one instance of positive training data. A machine learning model can be trained to identify inappropriate material based at least in part on the set of supplemental positive training data.

20 Claims, 8 Drawing Sheets

SYSTEMS AND METHODS FOR TRAINING MACHINE LEARNING MODELS TO CLASSIFY INAPPROPRIATE MATERIAL

FIELD OF THE INVENTION

The present technology relates to the field of machine learning. More particularly, the present technology relates to techniques for training machine learning models.

BACKGROUND

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others. To search among the posted content, users may provide queries to a search engine or be provided with recommended queries to conduct searches for desired content.

SUMMARY

Various embodiments of the present technology can include systems, methods, and non-transitory computer readable media configured to acquire at least one instance of positive training data based at least in part on at least one source. A set of supplemental positive training data can be generated based at least in part on the at least one instance of positive training data. A machine learning model can be trained to identify inappropriate material based at least in part on the set of supplemental positive training data.

In some embodiments, the set of supplemental positive training data can be generated based at least in part on a reformulation of the at least one instance of positive training data.

In some embodiments, the set of supplemental positive training data can be generated based at least in part on identifying at least one additional instance of positive training data based at least in part on a user activity associated with the at least one instance of positive training data and the at least one additional instance of positive training data.

In some embodiments, the set of supplemental positive training data can be generated based at least in part on generating an embedding based at least in part on the at least one instance of positive training data and determining at least one additional instance of positive training data based on the embedding.

In some embodiments, at least one additional instance of positive training data can be acquired based at least in part on at least one additional source. The at least one additional instance of positive training data can be adapted based on a translation or morphological change of the at least one instance of positive training data.

In some embodiments, the machine learning model can be trained by determining a training confidence value associated with the at least one instance of positive training data. The machine learning model can be trained based at least in part on whether the training confidence value exceeds a training confidence threshold.

In some embodiments, the trained machine learning model can be applied to at least one input data. Whether the at least one input data comprises inappropriate material can be determined based at least in part on the trained machine learning model.

In some embodiments, whether the at least one input data comprises inappropriate material can be determined by generating a confidence value associated with a likelihood that the at least one input data comprises inappropriate material. Whether the confidence value exceeds a confidence value threshold can be determined.

In some embodiments, the at least one input data can be filtered based at least in part on the determining.

In some embodiments, the inappropriate material comprises offensive, profane, racist, hate-related, pornographic, child exploitation, adult, illegal, violent, or terroristic content.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
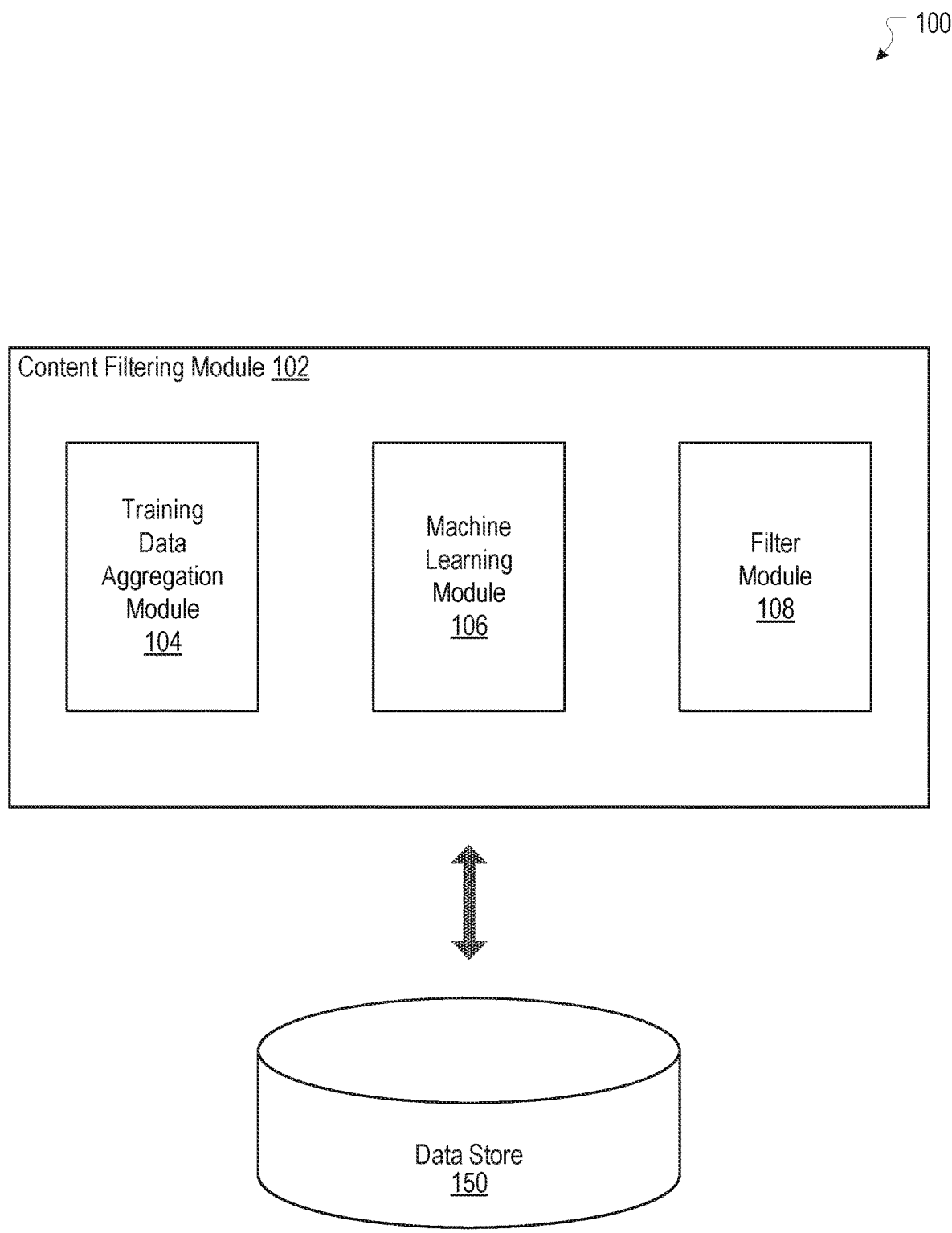
FIG. 1 illustrates an example system including an example content filtering module, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Generating Training Data for Identifying Inappropriate Material

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others. To search among the posted content, users may provide queries to a search engine or be provided with recommended queries to conduct searches for desired content.

Under conventional approaches, users can post content to a social network and search for content posted by other users on the social network. When a user searches for content on the social network, the social network can provide search recommendations based on searches performed by other users. For example, the user can search for "cats" and be provided "funny cat videos" as a search recommendation. The search recommendation may be based on other users performing searches for "funny cat videos" on the social network. Providing posted content and search recommendations to users in this manner can keep the users engaged in the social network and enhance the overall user experience associated with the social network. Unfortunately, users sometimes post offensive content on the social network or perform searches for offensive content. If a user is provided with offensive material, such as posted content or a search recommendation, then the user may have a negative experience, which diminishes the user's overall experience with the social network. Further, variations of the offensive material may be on the social network, and it may be possible for the user to have repeated negative experiences from being provided with the variations of the offensive material on different occasions. Unfortunately, under conventional approaches, identifying and removing offensive material presents a significant challenge. Further, as the number of users and the number of posted content on the social network continues to grow, conventional approaches to identifying and removing offensive material become increasingly ineffective. Thus, conventional approaches are not effective in addressing these and other problems arising in computer technology.

An improved approach rooted in computer technology overcomes the foregoing and other disadvantages associated with conventional approaches specifically arising in the realm of computer technology. In various embodiments, the present technology can apply a trained machine learning model to identify inappropriate material, such as offensive material, that may arise in a social networking system. The inappropriate material can include offensive search recommendations. The present technology can filter search recommendations so that offensive search recommendations are not provided to users. In general, a machine learning model can be trained with a large amount of training data. For example, a machine learning model can be provided with a large amount of labeled positive data (e.g., offensive phrases, offensive content, etc.) and a large amount of labeled negative data (e.g., inoffensive phrases, inoffensive content, etc.). Once the machine learning model is trained, it can be applied to input data, such as recently posted content or potential search recommendations, to determine whether the input data is positive (e.g., offensive) or negative (e.g., inoffensive). Based on the determination of the machine learning model, inappropriate material, including offensive search recommendations, can be identified and eliminated as potential search recommendations to users of the social networking system.

In various embodiments, the present technology can acquire training data from a variety of sources and generate supplemental training data in order to quickly and effectively train a machine learning model. In some cases, inappropriate material, and variations of the inappropriate material, can newly arise from, for example, a recent topic or event addressed on the social networking system. As just one example, a recent, controversial topic or event may cause inappropriate material to be posted to the social networking system or inappropriate searches to be performed by users on the social networking system. To quickly and effectively train a machine learning model to identify the newly arisen inappropriate material, a large amount of positive and negative training data can be acquired, generated, and provided to the machine learning model. For example, various instances of inappropriate material related to the topic or event can be acquired from a variety of sources. In some cases, the various instances of inappropriate material can be modified so that they are all of a common format. As just one example, inappropriate material in a sentence format can be modified so that the inappropriate material is in a search query format. In this example, the modification can be performed by, for example, removing certain grammatical elements. Based on the inappropriate material that has been acquired and modified, variations of the inappropriate material can be generated. The inappropriate material that has been acquired, modified, and generated collectively can constitute a large amount of training data to train a machine learning model. Accordingly, the trained machine learning model can quickly and effectively identify inappropriate material so that the inappropriate material is not provided to users of the social networking system. In various embodiments, the machine learning model can be trained to determine various types of inappropriate material, such as offensive material, profane material, racist material, hate-related material, pornographic material, child exploitation material, adult material, illegal material, violent material, terroristic material, etc. Additional details relating to the present technology are provided below.

FIG. 1 illustrates an example system 100 including an example content filtering module 102, according to an embodiment of the present technology. As shown in the example of FIG. 1, the content filtering module 102 can include a training data aggregation module 104, a machine learning module 106, and a filter module 108. In some embodiments, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details.

In some embodiments, the content filtering module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some embodiments, the content filtering module 102 can be implemented, in part or in whole, as software running on one or more computing devices or systems, such as on a user or client computing device. In one example, the content filtering module 102, or at least a portion thereof, can be implemented as or within an application (e.g., app), a program, or an applet, etc., running on a user computing device or a client computing system, such as the user device 610 of FIG. 6. In another example, the content filtering module 102 or at least a portion thereof can be implemented using one or more computing devices or systems that include one or more servers, such as network servers or cloud servers. In some embodiments, the content filtering module 102 can, in part or in whole, be implemented within or configured to operate in conjunction with a social networking system (or service), such as the social networking system 630 of FIG. 6.

The content filtering module 102 can be configured to communicate and/or operate with the at least one data store 150, as shown in the example system 100. The at least one data store 150 can be configured to store and maintain various types of data including, for example, training data for training a machine learning model. In some implementations, the at least one data store 150 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 150 can store information associated with users, such as user identifiers, user information, profile information, user specified settings, content produced or posted by users, and various other types of user data.

In various embodiments, the content filter module 102 can be configured to filter typeahead search recommendations. In general, typeahead search recommendations are search recommendations generated for a user as the user inputs a search query. As the user inputs the search query, typeahead search recommendations are generated based on what the user has inputted so far. As the user continues to input the search query, the typeahead search recommendations can be refined based on the what the user has inputted. For example, a user may perform a search using "funny cat videos" as a search query. As the user inputs the search query, typeahead search recommendations initially can be generated based on "funny." Example typeahead search recommendations based on "funny" may include "funny jokes," "funny pictures," and "funny videos." As the user continues inputting the search query, the typeahead search recommendations can be refined based on "funny cat." An example typeahead search recommendation based on "funny cat" can be "funny cat videos." The user can select the typeahead search recommendation for "funny cat videos" instead of completely inputting the search query. In some cases, typeahead search recommendations can be based on searches other users have performed. If a number of users perform a search using a similar search query within a period of time, the similar search query can become a typeahead search recommendation. In such cases, new typeahead search recommendations can be generated quickly in response to, for example, trending or viral search queries. Applying the approaches described herein, the content filter module 102 can filter newly generated typeahead search recommendations and prevent inappropriate material from being presented as typeahead search recommendations.

In various embodiments, the training data aggregation module 104 can collect or aggregate training data from a variety of sources, modify or adapt the training data, and generate supplemental training data for training a machine learning model. In general, training data for a machine learning model can include positive training data or negative training data. Positive training data can include topics, concepts, or materials that the machine learning model is trained to identify. For example, a machine learning model can be trained to identify inappropriate material, such as racist content. In this example, the machine learning model can be trained with labeled positive training data, which, in this example, is racist content, and labeled negative training data, which, in this example, is not racist content. To train the machine learning model, the training data aggregation module 104 can aggregate positive and negative training data, modify the training data such that they are of a common format consistent with a format of the material the machine learning model will be trained to identify, and generate additional training data to supplement the aggregated training data. More details regarding the training data aggregation module 104 will be provided below with reference to FIG. 2A.

In various embodiments, the machine learning module 106 can be trained with positive training data and negative training data, and applied to an input to determine whether the input is inappropriate material. For example, a machine learning model can be trained to identify hate speech content. Once trained, the machine learning model can be applied to an input, such as posted content or a potential search recommendation, to determine whether the input is hate speech content or is not hate speech content. More details regarding the machine learning module 106 will be provided below with reference to FIG. 3.

In various embodiments, the filter module 108 can remove or filter inappropriate material, thereby preventing inappropriate material from being presented to a user of a social networking system. In general, a machine learning model can be trained to identify one or more types of inappropriate material, and the filter module 108 can remove or filter the identified inappropriate material. For example, a machine learning model can be trained to identify adult-related material based on positive training data, which, in this example, is adult-related material, and negative training data, which, in this example, is not adult-related material. In this example, the trained machine learning model can be applied to a set of material (e.g., posted content, potential search recommendations, etc.), and the machine learning model can identify which, if any, material is adult-related material. The filter module 108 can remove or filter the set of material such that inappropriate material, which, in this example, is adult-related material, is not provided to a user. In some embodiments, a trained machine learning model can generate a confidence value corresponding to a likelihood that an input is inappropriate material. The filter module 108 can remove or filter content based on whether the confidence value equals or exceeds a threshold confidence value. For example, the filter module 108 can remove or filter an input (e.g., content, potential search recommendation) from being provided to a user based on a selected threshold confidence value, such as 0.70. In this example, if a trained machine learning model generates a confidence value for the input, such as 0.75, that is greater than the threshold confidence value, the threshold confidence value is satisfied by the input. Based on satisfaction of the threshold confidence value by the input, the filter module 108 can remove or filter the input so that the input is not provided to users of the social networking system. In some embodiments, confidence values and threshold confidence values are percentage values. A threshold confidence value can be selected based on the type of content to be filtered and other contextual factors. For example, a recent event, such as a hate crime, may cause inappropriate material related to the event to be provided to the social networking system. A machine learning model can be trained to identify the inappropriate material related to the event. In this example, it may be determined that the event is a particularly sensitive topic, and therefore a relatively lower threshold confidence value can be applied. By application of a relatively lower threshold confidence value, material to which the machine learning model has assigned relatively lower confidence values are filtered, and relatively more material is filtered or removed overall. Thus, the approaches described herein allow for removing or filtering inappropriate material based on determinations by machine learning models.

Figure 2A:
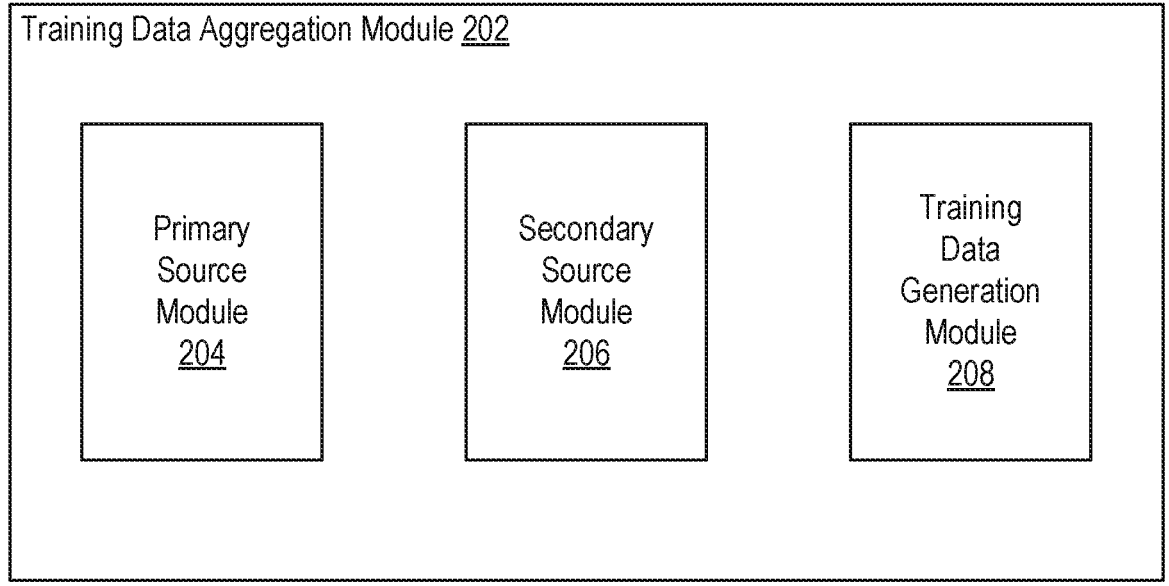
FIG. 2A illustrates an example of a training data aggregation module, according to an embodiment of the present technology.

FIG. 2A illustrates an example of a training data aggregation module 202 configured to acquire, collect, or generate training data from primary and secondary sources, according to an embodiment of the present technology. In various embodiments, primary and secondary sources can provide positive training data or negative training data. In some embodiments, training data provided by primary and secondary sources are manually rated or labeled as positive or negative. Such training data can be seeds from which supplemental training data can be generated. In some embodiments, the training data aggregation module 104 of FIG. 1 can be implemented as the training data aggregation module 202. As shown in FIG. 2A, the training data aggregation module 202 can include a primary source module 204, a secondary source module 206, and a training data generation module 208. The components (e.g., modules, elements, etc.) shown in this figure and all figures herein are exemplary only, and other implementations may include additional, fewer, integrated, or different components. Some components may not be shown so as not to obscure relevant details.

The primary source module 204 can aggregate training data from a number of primary sources. Primary sources can include entities that are separate and distinct from an entity that implements the content filtering module 102. In general, primary sources can be social network systems, content provision systems, content sharing systems, messaging systems, or other similar systems. Primary sources can provide, for example, manually generated training data (e.g., user-performed search queries, user-reported content, etc.) and training data associated with other trained machine learning models (e.g., search query clustering, other machine learning models trained to identify inappropriate material, etc.). Primary sources can provide directly useable training data to train a machine learning model. Directly useable training data can be labeled positive training data and labeled negative training data that can be used as training data without modification or conversion. In some cases, primary sources provide training data, for training a machine learning model, in a format that matches a format of input data to which the machine learning model can be applied. For example, a machine learning model can be trained to identify inappropriate search queries. In this example, the primary source module 204 can provide real search queries that have been performed by users and labeled as positive training data or negative training data. In this example, the training data provided by the primary source module 204 can be used as training data without modification or conversion as the format of the training data (i.e., search query) matches the format of what the machine learning model is trained to identify (i.e., search query). The primary source module 204 can aggregate positive training data and negative training data from a number of primary sources and provide the aggregated training data for training a machine learning model.

The secondary source module 206 can aggregate training data from a variety of secondary sources and modify, adapt, or format the aggregated training data to a common format. Secondary sources can include entities that are separate and distinct from primary sources and from an entity that implements the content filtering module 102. In general, secondary sources can be social network systems, content provision systems, content sharing systems, messaging systems, or other similar systems. For example, a secondary source can be a database that compiles inappropriate words, phrases, sentences, and paragraphs that have been formulated by users. Secondary sources can provide data that are not directly useable training data for training a machine learning model, but such data can be modified, adapted, or formatted to be useable training data. In some cases, secondary sources provide training data, for training a machine learning model, in a different format than a format of input data to which the machine learning model can be applied. For example, a machine learning model can be trained to identify inappropriate search queries. In this example, one of many secondary sources can be a content sharing system that collects comments posted by users to the content sharing system. In this example, the comments may include words, phrases, sentences, and paragraphs that have been labeled as offensive. These comments can be modified from their original formats to a search query format so that they can be utilized to train the machine learning model. Training data can be in a variety of formats including words, phrases, sentences, paragraphs, and essays. Modifications can include, for example, removing grammatical elements such as articles, prepositions, and pronouns. In some embodiments, training data from a secondary source can be modified from a long format (e.g., paragraph, essay) to a shorter format (e.g., phrase) based on contiguous sequences (e.g., n-grams) of characters, syllables, or words and the frequency of each contiguous sequence. For example, an essay about cars may contain several instances of a contiguous sequence of words, such as "I like cars." In this example, "I like cars" can be one of many phrases generated from modifying the essay. These phrases, which can be varying lengths, can be aggregated to provide training data to train a machine learning model that is to be applied to phrases. In some cases, sequences can be non-contiguous and comprise words separated by a distance. For example, one of many search queries that can be generated from modifying a question "Are cupcakes actually muffins or cakes?" can be a search query "cupcakes muffins cakes." Many variations are possible. In some embodiments, a secondary source can be a foreign language source. Foreign language sources can provided training data that can be translated and used as training data in other languages. For example, positive training data in a foreign language can be translated into English and used as positive training data for training a machine learning model that can be applied to English language inputs. The secondary source module 204 can aggregate positive training data and negative training data from a number of secondary sources and provide the aggregated training data for training a machine learning model.

The training data generation module 208 can generate training data from aggregated training data. In some cases, aggregating training data from multiple sources, for example, via the primary source module 204 or the secondary source module 206, may not immediately provide an amount of training data that is sufficient to effectively train a machine learning model. Accordingly, in some embodiments, the training data generation module 208 generates supplemental training data that can be utilized to train a machine learning model. Supplemental training data can be generated through a variety of methods. In various embodiments, the methods for generating supplemental training data described herein can be applied to foreign language sources. More details regarding the generation of supplemental training data will be provided below with reference to FIG. 2B. The components (e.g., modules, elements, etc.) shown in this figure and all figures herein are exemplary only, and other implementations may include additional, fewer, integrated, or different components. Some components may not be shown so as not to obscure relevant details.

Figure 2B:
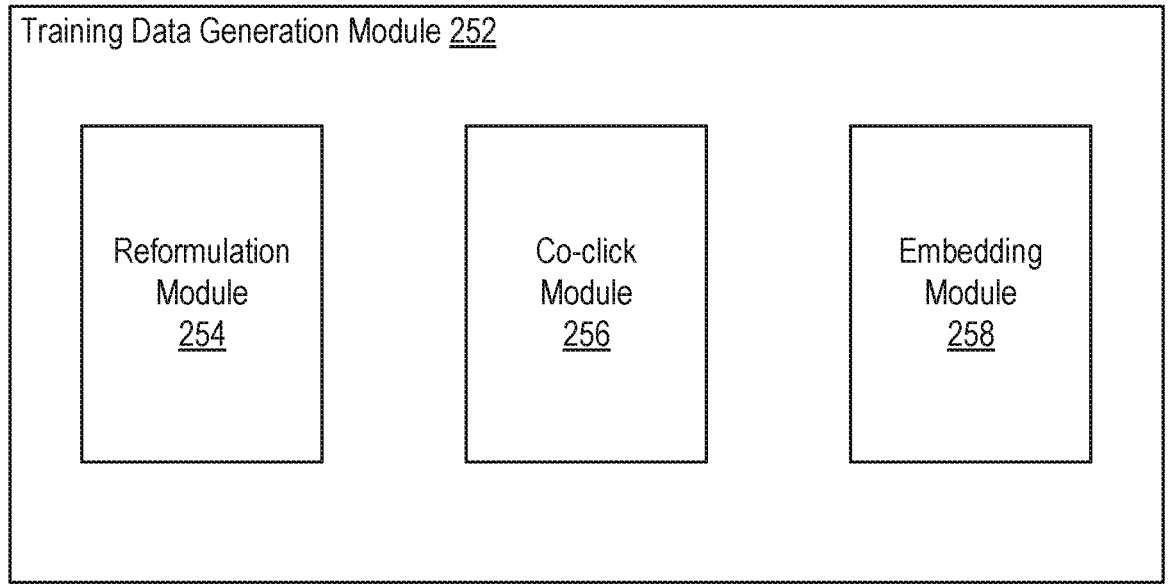
FIG. 2B illustrates an example of a training data generation module, according to an embodiment of the present technology.

FIG. 2B illustrates an example of a training data generation module 252 configured to generate training data from primary sources and secondary sources, according to an embodiment of the present technology. In various embodiments, generated training data can be confirmed to be positive training data or negative training data. For example, generated training data can be manually rated or labeled as positive or negative. In some embodiments, the training data generation module 208 of FIG. 2A can be implemented as the training data generation module 252. As shown in FIG. 2B, the training data generation module 252 can include a reformulation module 254, a co-click module 256, and an embedding module 258.

The reformulation module 254 can be configured to reformulate positive training data to generate supplemental positive training data. By reformulating positive training data, supplemental positive training data, based on the positive training data, can be generated to supplement the positive training data. Accordingly, the overall amount of positive training data can be increased. Reformulation of positive training data can involve manipulation (e.g., morphological changes to number, gender, case, tense, etc.), removal, addition, or revision of words or phrases in positive training data. As a few examples, reformulation can include applying common misspellings, correcting misspellings, replacing singular with plural, replacing plural with singular, removing words from phrases, adding words to phrases, combining phrases into words, separating words into phrases, replacing words in phrases with common analogs, and the like. Additionally, reformulation can add extensions to words (e.g., -ing, -tion, -ed, -er, etc.). For example, the word "inappropriate_word" may be identified as an inappropriate word and be labeled as positive training data. In this example, the positive training data, "inappropriate_word," can be supplemented with additional, generated positive training data. To do so, the word "inappropriate_word" can be reformulated by applying common misspellings or by adding words to form phrases, such as "inappropriate_word_person" or "inappropriate_word_object." These reformulated words and phrases can be added to an existing positive training data set.

The co-click module 256 can be configured to utilize positive training data to identify supplemental training data based on user activity patterns. In general, "co-click" refers to interrelationships between user activity and content. For example, one or more users may perform different user interactions that produce similar results. As just one example, when one or more users interact with multiple things (e.g., performing multiple searches with multiple phrases) and produce similar results (e.g., produce similar search results) the one or more users have "co-clicked" the multiple things. In some cases, co-click can be limited to a certain time threshold (e.g., searches performed within a certain amount of time) or number threshold (e.g., certain number of searches performed). For example, a first user may provide an inappropriate phrase to a search engine to conduct an electronic search. The electronic search may produce a page that has been flagged or is later flagged as inappropriate. The inappropriate phrase can be used as positive training data to train a machine learning model. Subsequently, a second user may provide other inappropriate phrases to conduct other electronic searches that produce the inappropriate page. The other inappropriate phrases provided by the second user can constitute additional positive training data. In some cases, a threshold duration of time can be applied to electronic searches conducted by one or more users. For example, the phrase "inappropriate_meme" may be identified as inappropriate material and constitute positive training data. A user may perform an electronic search using the phrase "inappropriate_meme" and click a page from a search result. Subsequently, within a threshold duration of time, one or more users may conduct other searches based on "inappropriate_meme_video," "inappropriate_meme_group," and other inappropriate phrases and also click the same page from the different, respective search results. In this example, because "inappropriate_meme" is positive training data, then the other inappropriate phrases that result in clicks on the same page can be supplemental positive training data. Supplemental positive training data can be added to existing positive training data to provide a larger overall set of positive training data.

The embedding module 258 can be configured to apply a machine learning model to positive training data to determine supplemental training data. In general, an embedding can be a numerical (or vector-based) representation of various features that describe a word or phrase. Embeddings can be used to determine various interrelationships between different words and phrases. For example, embeddings that represent different search queries can be mapped to a vector space. Embeddings that are within a certain threshold distance from one another in the vector space can reflect a similarity between their corresponding search queries. In various embodiments, the embedding module 258 can determine an embedding for positive training data. Based on the embedding and embeddings of other potential training data that are located within a threshold distance from the embedding, the embedding module 258 can identify other potential training data that can be used as supplemental positive training data. For example, a phrase may be identified as offensive material and constitute positive training data. Based on an embedding of the offensive phrase and proximity of embeddings of other phrases within a threshold distance in the vector space, it can be determined that the phrase and the other phrases are similar phrases. Accordingly, if the phrase is to be used as positive training data, then the other phrases can constitute positive training data to supplement the original training data. In some embodiments, similar phrases can be determined based on a nearest neighbor approach applied to their embeddings in the vector space.

Figure 3:
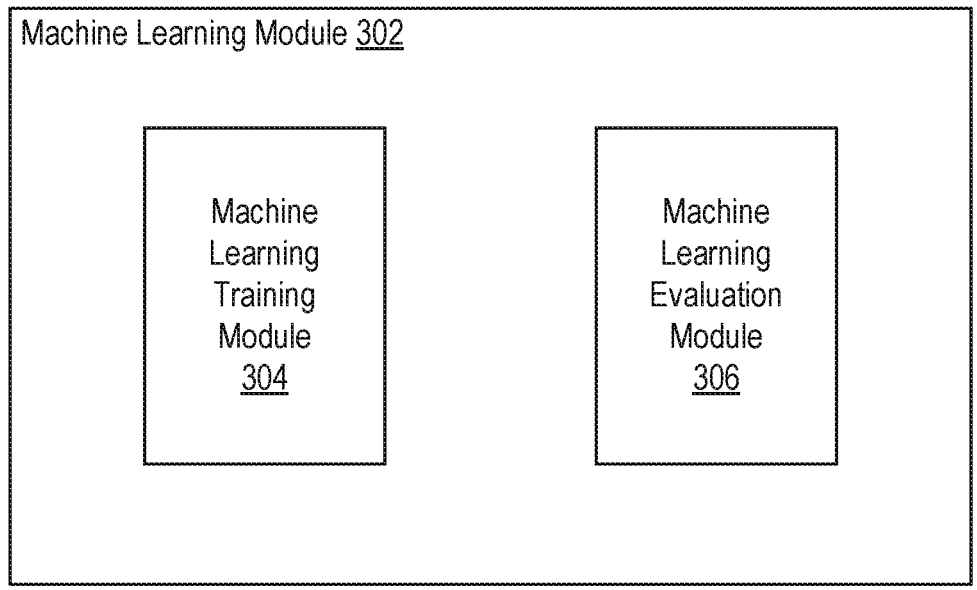
FIG. 3 illustrates an example of a machine learning module, according to an embodiment of the present technology.

FIG. 3 illustrates an example of a machine learning module 302 configured to train and apply a machine learning model to identify or classify inappropriate material. In some embodiments, the machine learning module 106 of FIG. 1 can be implemented as the machine learning module 302. As shown in FIG. 3, the machine learning module 302 can include a machine learning training module 304 and a machine learning evaluation module 306. The components (e.g., modules, elements, etc.) shown in this figure and all figures herein are exemplary only, and other implementations may include additional, fewer, integrated, or different components. Some components may not be shown so as not to obscure relevant details.

The machine learning training module 302 can be configured to train a machine learning model to identify inappropriate material. Training data for training the machine learning model can include positive training data, such as inappropriate material, and negative training data, such as not inappropriate material. Positive training data can be determined based on the type of inappropriate material the machine learning model is intended to identify. In some embodiments, positive training data can include offensive material, profane material, racist material, hate-related material, pornographic material, child exploitation material, adult material, illegal material, violent material, terroristic material, etc. Positive training data and negative training data can be acquired through primary or secondary sources, such as, from the primary source module 204 and the secondary source module 206, as described above. Additional positive training data can be generated, such as by the training data generation module 208. The machine learning training module 302 can retrain the machine learning model based on new or updated training data. Further, as additional positive training data or negative training data is acquired, the additional data can be utilized as training data for retraining the machine learning model. Accordingly, as primary or secondary sources provide new or additional training data, and as new supplemental training data are generated, the machine learning training module 302 can continually train and retrain the machine learning model.

In general, a machine learning model can be trained based on an amount of positive training data and negative training data. In some cases, collecting or providing an insufficient amount of positive training data may result in an ineffectively trained and inaccurate machine learning model. In other cases, collecting or providing redundant positive training data may result in a trained machine learning model with limited application. Accordingly, in various embodiments, the machine learning training module 302 can determine a training confidence threshold for a machine learning model and a training confidence value for an instance of training data. The training confidence threshold can be associated with a level of accuracy, precision, and/or recall with which a machine learning model can identify inputs as positive or negative. In general, precision and recall can be related (e.g., inverse relationship) and, accordingly, in some embodiments, the training confidence threshold can vary based on desired levels of precision and recall. For example, a high training confidence threshold may produce a machine learning model with high precision and lower recall (e.g., low number of incorrectly identified positive data and low number of identified positive data overall) and a low training confidence threshold may produce a machine learning model with low precision and higher recall (e.g., high number of incorrectly identified positive data and high number of identified positive data overall). The training confidence threshold can be compared with a training confidence value associated with an instance of training data. The training confidence value can indicate a level of confidence with which a machine learning model can identify the instance of training data as positive or negative. Training confidence threshold and training confidence value can be values between 0 and 1, 0 and 1000, or percentage values. Many variations are possible. For example, the machine learning training module 302 can be provided with a search query that has not been labeled as positive or negative. The machine learning module 302 can determine a training confidence value (e.g., 0.35, 350, etc.) for the search query. This training confidence value can correspond to a level of confidence with which a machine learning model can identify the search query as positive or negative. If the training confidence value is below a training confidence threshold (e.g., 10, 100, 500, 900, etc.), the machine learning training module 302 can determine that the machine learning model may require additional training data related to the search query. In some embodiments, upon such a determination, the machine learning training module 302 provides the search query to reviewers for manual review to update the training of the machine learning model. Accordingly, the search query can be labeled as positive training data or negative training data and provided as training data to the machine learning model. Additionally, supplemental positive training data to train the machine learning model can be acquired from primary sources or secondary sources, or can be generated by, for example, the reformulation module 254, the co-click module 256, and the embedding module 258, as described above.

In some embodiments, the machine learning training module 302 can determine a training confidence value for an instance of positive training data and, based on whether the training confidence value exceeds a training confidence threshold, acquire additional positive training data. As described above, a training confidence threshold can be determined based on a desired level of accuracy, precision, and/or recall with which a machine learning model identifies positive or negative inputs. The desired level of accuracy, precision, and/or recall can be associated with a threshold amount of positive training data and negative training data or a proportion of positive training data and negative training data. For example, it may be determined that a preferred level of precision and recall for identifying inappropriate search queries is associated with a range of ratios from 5:95 to 10:90 of positive training data to negative training data. Accordingly, a training confidence threshold can be determined based on the range of ratios. In some embodiments, a training confidence value can be determined for an instance of positive training data. The training confidence value can be determined based on a current level of training a machine learning model has with regard to the instance of positive training data. The current level of training can be associated with an amount of positive training data and an amount of negative training data already provided to the machine learning model. If the training confidence value exceeds a training confidence threshold, it can be determined that a threshold level of confidence has been achieved with regard to the instance of positive training data. In some embodiments, such a determination can indicate that the instance of positive training data does not need to be manually reviewed. For example, the machine learning training module 302 can be provided with an inappropriate search query as an instance of training data. The machine learning training module 302 can determine a training confidence value for the inappropriate search query. If the training confidence value exceeds a training confidence threshold, the machine learning training module 302 can determine that a threshold level of confidence has been achieved with regard to the instance of training data. Accordingly, the instance of training data is not provided to reviewers for manual review. In one embodiment, only training data that fall below a training confidence threshold are provided to reviewers for manual review. Accordingly, training the machine learning model can be directed primarily towards areas where positive training data is insufficient.

The machine learning evaluation module 304 can be configured to apply a trained machine learning model to identify inappropriate material. In some embodiments, the trained machine learning model can accept, as input, potential search recommendations. The trained machine learning model can process these inputs and generate a confidence value corresponding to the likelihood that each input is inappropriate material. For example, a recently publicized remark made by a public figure may cause a number of search queries to be provided on a social networking system. A machine learning model can be trained to identify inappropriate material, such as inappropriate search queries. The machine learning model can be provided a set of search recommendations based on recent, commonly performed search queries. The set of search recommendations can be potentially presented to a user as selectable options for the user in conducting a search. The machine learning model can generate a confidence value corresponding to the likelihood that each search recommendation is inappropriate material. Accordingly, the inappropriate search queries can be filtered and removed from potential search recommendations. In some embodiments, a confidence value generated by the machine learning model is a numerical value between 0 and 1, 0 and 1000, or a percentage value.

Figure 4:
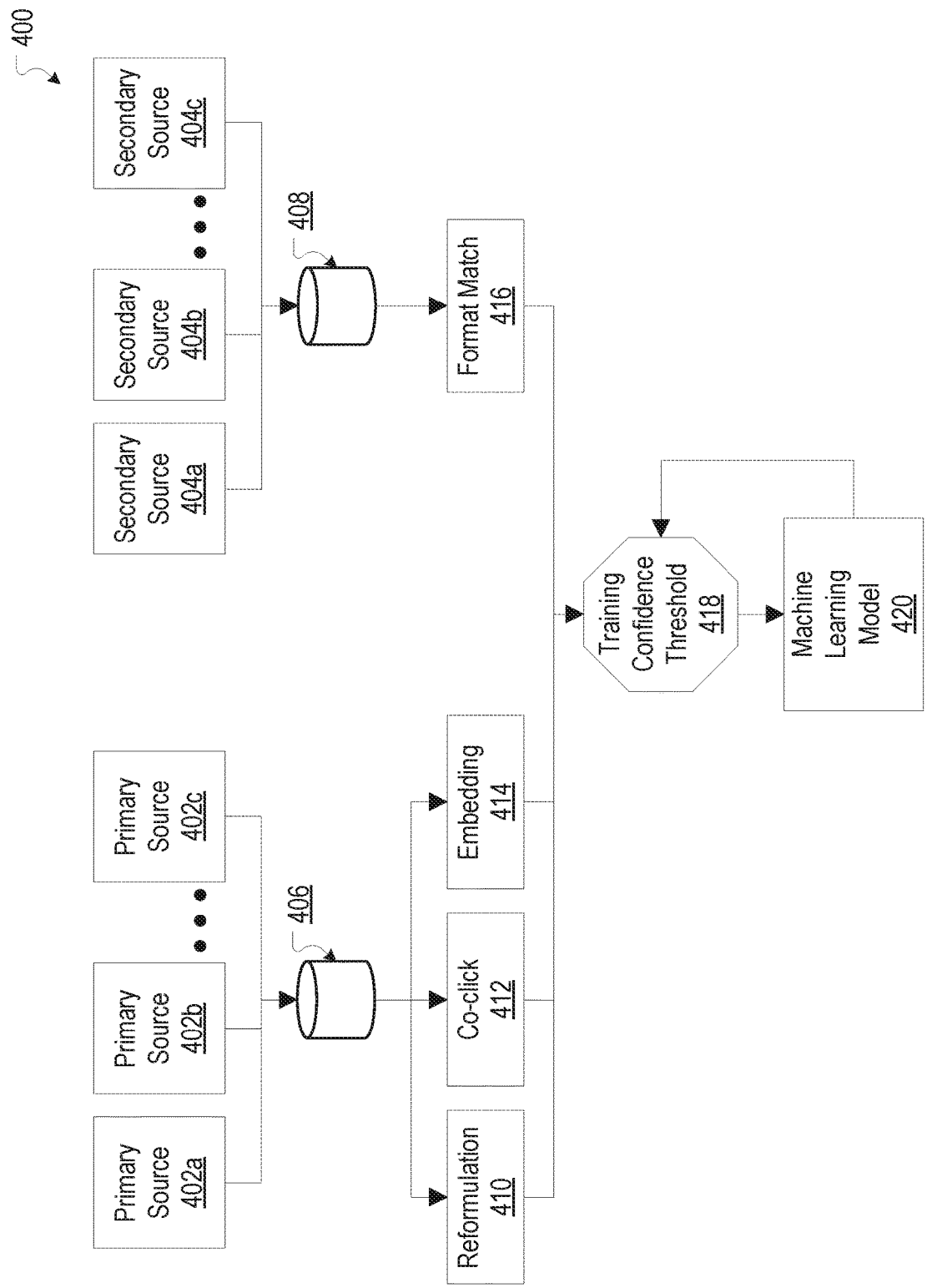
FIG. 4 illustrates an example functional block diagram, according to an embodiment of the present technology

FIG. 4 illustrates an example functional block diagram 400 for aggregating training data, generating training data, and training a machine learning model, according to an embodiment of the present technology. Various functionalities associated with the functional block diagram 400 can be performed by the content filtering module 102, as described above. Primary sources 402a-c can provide directly useable training data for training a machine learning model 420 to identify inappropriate material. Training data from the primary sources 402a-c can be aggregated and stored in a primary data store 406. Based on the training data in the primary data store 406, additional training data can be generated through processing associated with reformulation 410, co-click 412, or embedding 414. Secondary sources 404a-c can provide training data that, upon conversion to a format matching the training data from the primary sources 402a-c, can be used for training the machine learning model 420. Training data from secondary sources 404a-c can be aggregated and stored in a secondary data store 408. The training data in the secondary store 408 can be modified to appropriate formats through format match 416. Modification can include, for example, translation or morphological changes to the training data, as described above. A training confidence threshold 418 is associated with a determination as to whether the training data from the primary sources 402a-c and the secondary sources 404a-c is sufficient. Based on a determination that the training data is sufficient, the training data may be used to train the machine learning model 420. As described above, training data from primary sources 402a-c and secondary sources 404a-c can be seeds from which additional training data can be generated. In some cases, a determination that the training data is insufficient may trigger an acquisition of additional training data from additional primary sources 402a-c, secondary sources 404a-c, reformulation 410, co-click 412, or embedding 414. The trained machine learning model 420 can be applied to an input to determine whether the input is inappropriate material. All examples herein are provided for illustrative purposes, and there can be many variations and other possibilities.

Figure 5:
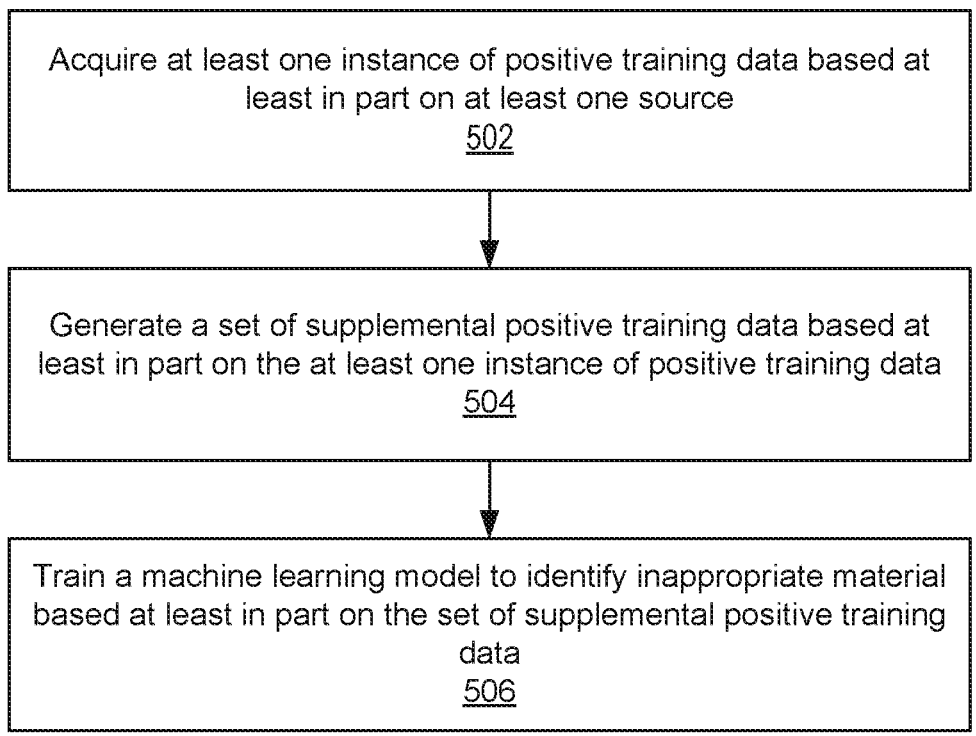
FIG. 5 illustrates an example process for training a machine learning model, according to an embodiment of the present technology.

FIG. 5 illustrates an example method 500 for training a machine learning model, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 acquires at least one instance of positive training data based at least in part on at least one source. The at least one instance of positive training data can be acquired based on a primary or a secondary source, as described above. At block 504, the example method 500 generates a set of supplemental positive training data based at least in part on the at least one instance of positive training data. The set of supplemental positive training data can be generated based on, for example, a reformulation, a co-click, or an embedding, as described above. At block 506, the example method 500 trains a machine learning model to identify inappropriate material based at least in part on the set of supplemental positive training data. In some embodiments, the machine learning model can be trained to identify or classify any type of input as positive or negative using the approaches described above.

It is contemplated that there can be many other uses, applications, and/or variations associated with the various embodiments of the present technology. For example, various embodiments of the present technology can learn, improve, and/or be refined over time. While some examples herein refer to identification of offensive search queries, it is contemplated that the present technology can be applied to various content types and categories. For example, in some cases, the present technology may be applied to media content items. In some cases, the present technology can identify content in various categories such as sports or locations. Additionally, the present technology can also ensure that various privacy settings and preferences are maintained and can prevent private information from being divulged. For example, in some cases, user can choose whether or not to opt-in to utilize the present technology.

Social Networking System—Example Implementation

Figure 6:
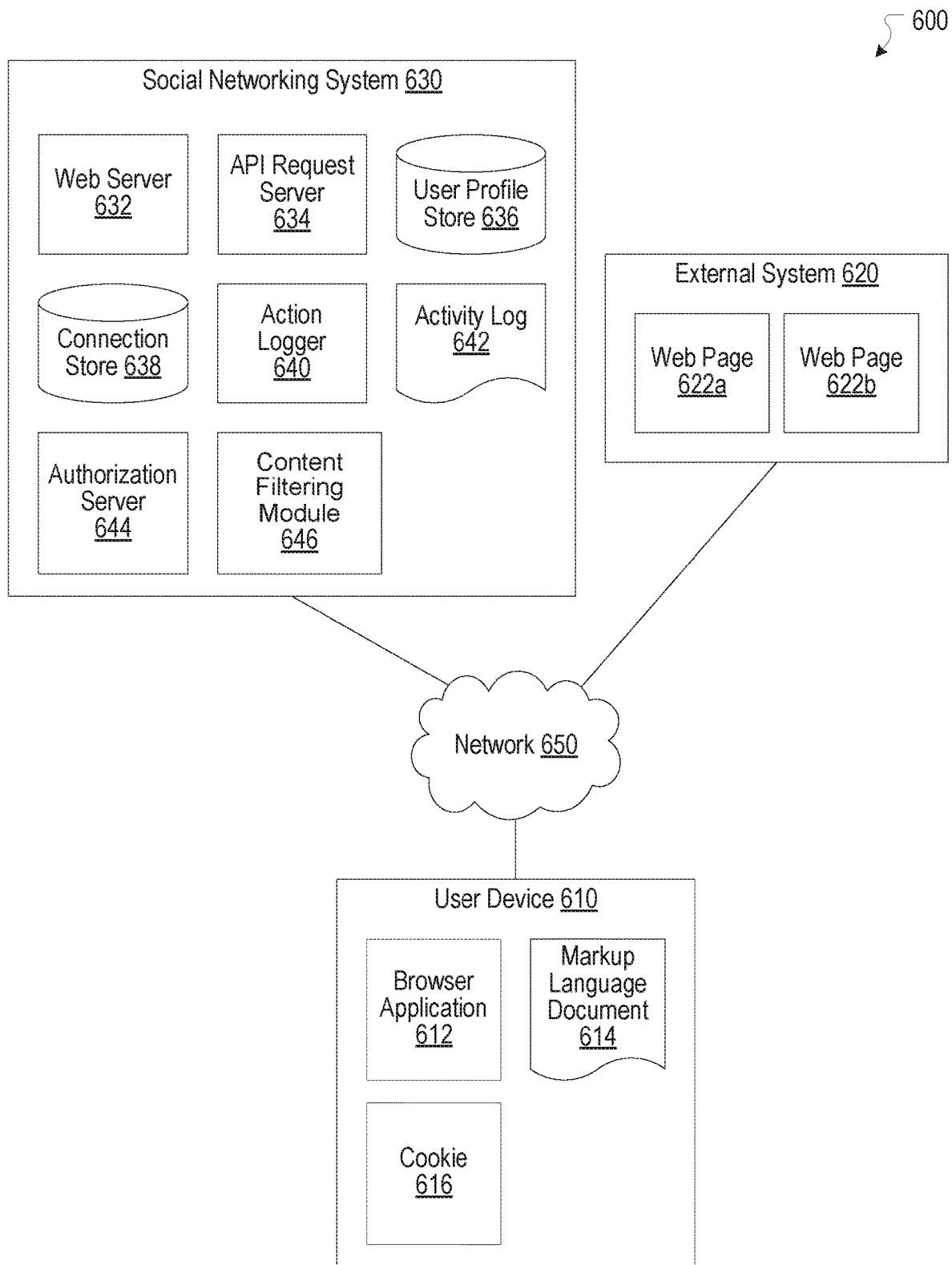
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects another user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities.

The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content filtering module 646. The content filtering module 646 can, for example, be implemented as the content filtering module 102 of FIG. 1. In some embodiments, some or all of the functionality and modules of the content filtering module 646 (e.g., sub modules of the content filtering module 102) instead can be implemented in the user device 610.

Hardware Implementation

Figure 7:
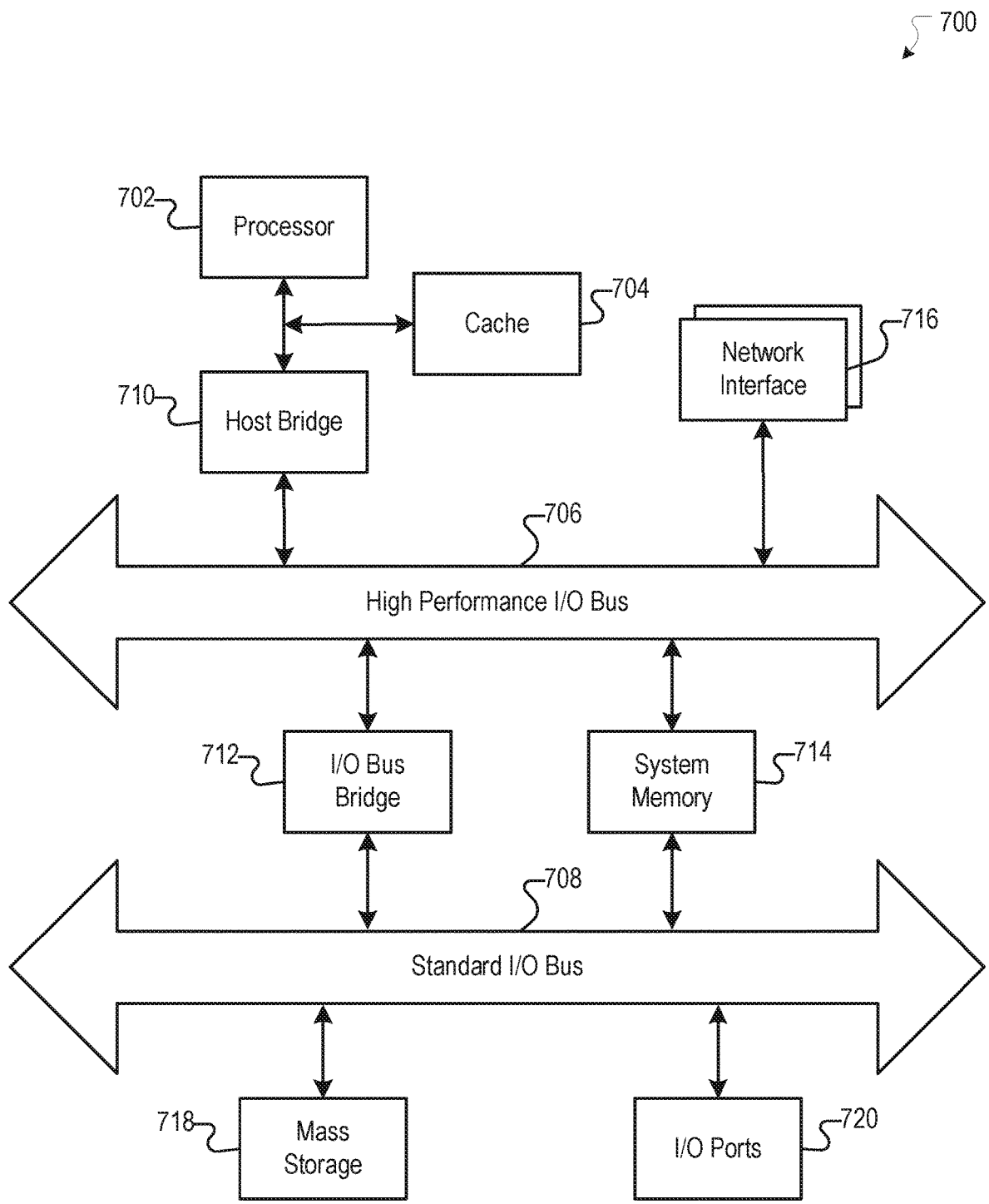
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the embodiments of the invention are intended to be illustrative, but not limiting, of the scope of the invention, which is set forth in the following claims.

What is claimed is:

1. A computer-implemented method comprising:
    acquiring, by a computing system, at least one instance of positive training data based at least in part on at least one source, wherein the at least one instance of positive training data includes a search query by a first user provided to a search engine to produce a search result;
    generating, by the computing system, a set of supplemental positive training data, wherein the generating comprises:
        generating, by the computing system, a first instance of supplemental positive training data based at least in part on at least one of: a change in gender, or an application of a misspelling to the at least one instance of positive training data;
        generating, by the computing system, a second instance of supplemental positive training data based at least in part on an additional search query provided by a second user to the search engine that produces the same search result as the search query; and
        generating, by the computing system, a third instance of supplemental positive training data based at least in part on an embedding of the at least one instance of positive training data;
    training, by the computing system, a machine learning model to identify inappropriate material based at least in part on the first instance, the second instance, and the third instance of supplemental positive training data; and
    identifying, by the computing system, the inappropriate material in content based on the trained machine learning model.

2. The computer-implemented method of claim 1, wherein generating the set of supplemental positive training data further comprises:

generating, by the computing system, a fourth instance of supplemental positive training data based at least in part on a reformulation of the at least one instance of positive training data.

3. The computer-implemented method of claim 1, wherein generating the set of supplemental positive training data further comprises:
  generating, by the computing system, a fourth instance of supplemental positive training data based at least in part on a user activity associated with the at least one instance of positive training data and at least one additional instance of positive training data identified based at least in part on the user activity.

4. The computer-implemented method of claim 1, wherein generating the third instance of supplemental positive training data is further based at least in part on a nearest neighbor approach applied to the embedding in a vector space.

5. The computer-implemented method of claim 1, further comprising:
  acquiring, by the computing system, at least one additional instance of positive training data based at least in part on at least one additional source; and
  adapting, by the computing system, the at least one additional instance of positive training data based at least in part on a translation or morphological change of the at least one instance of positive training data.

6. The computer-implemented method of claim 1, wherein training the machine learning model comprises:
  determining, by the computing system, a training confidence value associated with the at least one instance of positive training data; and
  training, by the computing system, the machine learning model based at least in part on whether the training confidence value exceeds a training confidence threshold.

7. The computer-implemented method of claim 1, wherein identifying the inappropriate material in content comprises:
  applying, by the computing system, the trained machine learning model to at least one input data; and
  determining, by the computing system, whether the at least one input data comprises the inappropriate material based at least in part on the trained machine learning model.

8. The computer-implemented method of claim 7, wherein determining whether the at least one input data comprises inappropriate material comprises:
  generating, by the computing system, a confidence value associated with a likelihood that the at least one input data comprises inappropriate material; and
  determining, by the computing system, whether the confidence value exceeds a confidence value threshold.

9. The computer-implemented method of claim 7, further comprising:
  filtering, by the computing system, the at least one input data based at least in part on the determining.

10. The computer-implemented method of claim 1, wherein the inappropriate material comprises offensive, profane, racist, hate-related, pornographic, child exploitation, adult, illegal, violent, or terroristic content.

11. A system comprising:
  at least one processor; and
  a memory storing instructions that, when executed by the at least one processor, cause the system to perform a method comprising:
    acquiring at least one instance of positive training data based at least in part on at least one source, wherein the at least one instance of positive training data includes a search query by a first user provided to a search engine to produce a search result;
    generating a set of supplemental positive training data, wherein the generating comprises:
      generating a first instance of supplemental positive training data based at least in part on at least one of: a change in gender, or an application of a misspelling to the at least one instance of positive training data;
      generating a second instance of supplemental positive training data based at least in part on an additional search query provided by a second user to the search engine that produces the same search result as the search query; and
      generating a third instance of supplemental positive training data based at least in part on an embedding of the at least one instance of positive training data;
    training a machine learning model to identify inappropriate material based at least in part on the first instance, the second instance, and the third instance of supplemental positive training data; and
    identifying the inappropriate material in content based on the trained machine learning model.

12. The system of claim 11, wherein generating the set of supplemental positive training data further comprises:
  generating a fourth instance of supplemental positive training data based at least in part on a reformulation of the at least one instance of positive training data.

13. The system of claim 11, wherein generating the set of supplemental positive training data further comprises:
  generating a fourth instance of supplemental positive training data based at least in part on a user activity associated with the at least one instance of positive training data and at least one additional instance of positive training data identified based at least in part on the user activity.

14. The system of claim 11, wherein generating the third instance of supplemental positive training data is further based at least in part on a nearest neighbor approach applied to the embedding in a vector space.

15. The system of claim 11, the method further comprising:
  acquiring at least one additional instance of positive training data based at least in part on at least one additional source; and
  adapting the at least one additional instance of positive training data based at least in part on a translation or morphological change of the at least one instance of positive training data.

16. A non-transitory computer-readable storage medium including instructions that, when executed by at least one processor of a computing system, cause the computing system to perform a method comprising:
  acquiring at least one instance of positive training data based at least in part on at least one source, wherein the at least one instance of positive training data includes a search query by a first user provided to a search engine to produce a search result;
  generating a set of supplemental positive training data, wherein the generating comprises:
    generating a first instance of supplemental positive training data based at least in part on at least one of: a change in gender, or an application of a misspelling to the at least one instance of positive training data;

generating a second instance of supplemental positive training data based at least in part on an additional search query provided by a second user to the search engine that produces the same search result as the search query; and generating a third instance of supplemental positive training data based at least in part on an embedding of the at least one instance of positive training data;

training a machine learning model to identify inappropriate material based at least in part on the first instance, the second instance, and the third instance of supplemental positive training data; and identifying the inappropriate material in content based on the trained machine learning model.

17. The non-transitory computer-readable storage medium of claim 16, wherein generating the set of supplemental positive training data further comprises:

generating a fourth instance of supplemental positive training data based at least in part on a reformulation of the at least one instance of positive training data.

18. The non-transitory computer-readable storage medium of claim 16, wherein generating the set of supplemental positive training data further comprises:

generating a fourth instance of supplemental positive training data based at least in part on a user activity associated with the at least one instance of positive training data and at least one additional instance of positive training data identified based at least in part on the user activity.

19. The non-transitory computer-readable storage medium of claim 16, wherein generating the third instance of supplemental positive training data is further based at least in part on a nearest neighbor approach applied to the embedding in a vector space.

20. The non-transitory computer-readable storage medium of claim 16, the method further comprising:

acquiring at least one additional instance of positive training data based at least in part on at least one additional source; and adapting the at least one additional instance of positive training data based at least in part on a translation or morphological change of the at least one instance of positive training data.

\* \* \* \* \*